(12) United States Patent
Dittrich

(10) Patent No.: US 7,055,782 B2
(45) Date of Patent: Jun. 6, 2006

(54) CELLULAR ACTUATOR DEVICE AND METHODS OF MAKING AND USING SAME

(75) Inventor: Kay Dittrich, Hoehenkirchen (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/866,103

(22) Filed: Jun. 14, 2004

(65) Prior Publication Data

US 2005/0029406 A1 Feb. 10, 2005

(30) Foreign Application Priority Data

Jun. 12, 2003 (DE) .................. 103 26 366

(51) Int. Cl.
*B64C 13/36* (2006.01)
(52) U.S. Cl. .............. 244/219; 244/99.5; 244/123.11; 92/48
(58) Field of Classification Search ................ 244/219, 244/75 R, 78, 218, 124, 99.5, 123.11; 92/48, 92/50, 37–39, 92
See application file for complete search history.

(56) References Cited

U.S. PATENT DOCUMENTS 3,118,639 A * 1/1964 Kiceniuk .................. 244/219
4,349,169 A * 9/1982 McAnally .................. 244/219
4,502,280 A * 3/1985 McCoy ....................... 60/567
4,939,982 A * 7/1990 Immega et al. .............. 92/92
5,845,879 A * 12/1998 Jensen ..................... 244/135 R
6,015,115 A * 1/2000 Dorsett et al. .............. 244/123
6,199,796 B1 * 3/2001 Reinhard et al. ......... 244/35 R
6,347,769 B1 * 2/2002 To et al. ..................... 244/219
6,487,959 B1 * 12/2002 Perez et al. .................. 92/92
6,491,262 B1 * 12/2002 Kota .......................... 244/219
2005/0081711 A1 * 4/2005 Kerekes et al. ............. 92/48

* cited by examiner

*Primary Examiner*—Galen Barefoot
(74) *Attorney, Agent, or Firm*—Crowell & Moring LLP

(57) ABSTRACT

A cellular actuator device suitable for a control surface of an aircraft or space craft has a number of elementary cells which are combined to a common arrangement and are formed by pressure-tight chambers. The elementary cells can be acted upon by a pressure medium and, when acted upon by the pressure medium, can be deformed in at least one work direction while changing their length. The elementary cells are coupled for combining their length changes in the at least one working direction to an overall movement of the elementary cell arrangement. The actuator device is particularly suitable for actuating a control surface of an aircraft or spacecraft.

40 Claims, 6 Drawing Sheets

P1>P2
CONTRACTION

P1<P2
EXPANSION

P1<P2
EXPANSION

P1=P2
NEUTRAL POSITION

P1>P2
CONTRACTION

CONTRACTING ELEMENTARY CELL

EXPANDING ELEMENTARY CELL

BIDIRECTIONAL ELEMENTARY CELL

ELONGATED BIDIRECTIONAL ELEMENTARY CELL

ELLIPTICAL CONTRACTING ELEMENTARY CELL 2-d EXPANDING ELEMENTARY CELL 2-d BIDIRECTIONAL ELEMENTARY CELL

CONCAVE DOME

CONVEX DOME

SEAL AND COVER PLATES

CELLULAR ACTUATOR DEVICE AND METHODS OF MAKING AND USING SAME

BACKGROUND AND SUMMARY OF THE INVENTION

This application claims the priority of DE 10326366.7 filed Jun. 12, 2003, the disclosure of which is expressly incorporated by reference herein.

The invention relates to a cellular actuator device. Especially preferred embodiments of the invention relate to a cellular actuator device for actuating a control surface of an aircraft or spacecraft.

Conventionally, hydraulic actuators are predominantly used for actuating control surfaces of aircraft or spacecraft, such as control surfaces or trimming surfaces which are provided in a wing or in a fin an aircraft or spacecraft, particularly of an airplane. As a rule, these comprise of cylindrical hydraulic pistons which cause a displacement in the form of a linear movement between two control points.

When this wide-spread concept of the hydraulic cylinder is used for applications in which the linear movement is to be carried out on a broader surface, additional mechanical auxiliary constructions are required. A classical example is the actuation of a control surface of an airplane. As illustrated in FIG. 1, for the directional control of an airplane, for example, as a rule, a stationary vertical fin 2 and a rudder 3, which can be moved relative to the fin 3, are provided. The rudder 3 is rotatably disposed on the vertical fin 2 by means of a hinge 4 consisting of several joints and can be actuated by means of a hydraulic cylinder 5. The joints of the hinge 4 hold the vertical fin 2 and the rudder 3 against one another and have the result that the rudder 3 can carry out only movements about the joint axis with respect to the fin 2. The hydraulic cylinder 5 connects the fin 2 and the rudder 3 by way of a lever arm 5a, which is only outlined in the figure, and thereby can, on the one hand, absorb the torsional moment about the joint axis occurring because of the rudder loading and, on the other hand, cause an adjustment of the rudder 3 with respect to the fin 2. For reasons relating to the fail-safe characteristic, redundant hydraulic systems are often required, which is achieved by a combination of several hydraulic cylinders on one rudder. In this case, additional complex measures are required for ensuring the operability also during the blockage of one of the hydraulic cylinders.

It is a significant disadvantage that the loads are distributed on the rudder and the fin in a planar manner but can be transmitted only locally by way of the joints and the hydraulic cylinder or cylinders between the two components. The structure of the fin and the rudder therefore has to be reinforced such that the loads building up on the surface as a result of the aerodynamic stress and the mass loads can be guided to the local force introduction sites, specifically the joints and the fastening points of the hydraulic cylinder or cylinders. The above explanations on the example of a rudder of an airplane analogously apply to most control surfaces of an aircraft or spacecraft.

It is an object of the invention to provide an improved actuator device which is capable of absorbing loads distributed in a planar manner.

According to an aspect of the invention, this object is achieved by providing a cellular actuator device having a number of elementary cells, which are combined to a common arrangement and are formed by pressure-tight chambers, which elementary cells can be acted upon by a pressure medium and, when acted upon by the pressure medium, can be deformed in at least one work direction while changing their length, wherein the elementary cells are coupled for combining their length changes in the at least one working direction to an overall movement of the elementary cell arrangement.

Advantageous embodiments and further developments of cellular actuator devices according to preferred embodiments of the invention are described herein and in the claims.

The invention provides a cellular actuator device having a number of elementary cells combined to a joint arrangement and formed by pressure-tight chambers, which elementary cells can be acted upon by a pressure medium and, when being acted upon by the pressure medium, can be deformed while changing their length in at least one working direction, the elementary cells, for the combination of their length changes, being coupled in the at least one working direction to an overall movement of the elementary cell arrangement.

A significant advantage of the cellular actuator device according to the invention is the fact that it can be provided in a planar, largely arbitrarily curved or also cylindrical or spherical arrangement. In this case, the elementary cells each take over a part of the function of the entire actuator device. Advantageously, hydraulic liquid or a gas, such as air can be used as the pressure medium.

According to certain preferred embodiments of the cellular actuator device, the elementary cells can each contain a single pressure-tight chamber.

According to certain preferred embodiments of the invention, when the pressure-tight chambers are acted upon by pressure medium, the elementary cells may be deformable in a contracting manner in the working direction while changing their length.

According to certain preferred embodiments of the invention, when the pressure-tight chambers are acted upon by the pressure medium, the elementary cells may be deformable in an expanding manner in the working direction while changing their length.

According to certain preferred embodiments of the invention, the elementary cells may each contain at least one first pressure-tight chamber and at least one second pressure-tight chamber. In this case, it is particularly advantageous, when the (here thus defined) first pressure-tight chambers are acted upon, for the elementary cells to be deformable in a contracting manner in the working direction while their length is changed.

Correspondingly, it may further be provided in certain preferred embodiments of the invention, that, when the (here thus defined) second pressure-tight chambers are acted upon, the elementary cells can be deformed in an expanding manner in the working direction while changing their length.

Advantageously according to certain preferred embodiments of the invention, the (first) pressure-tight chambers have an essentially convex cross-sectional shape in the direction parallel to the working direction, an action by means of the pressure medium, while reinforcing the convexity of the pressure-tight chambers, causing an enlargement of the extension transversely to the working direction and a contraction in the working direction.

Advantageously according to certain preferred embodiments of the invention, on the other hand, the (second) pressure-tight chambers have an essentially concave cross-sectional shape in the direction parallel to the working direction, an action by means of the pressure medium, while decreasing the concavity of the pressure-tight chambers, causing an enlargement of the extension transversely to the working direction and an expansion in the working direction.

According to certain preferred embodiments of the invention, the pressure-tight chambers are preferably delimited by ends, which are mutually opposite in the working direction, and by side walls extending between the ends, and upper and lower cover walls sealing off the chambers on their top side and their bottom side.

In this case, it is particularly advantageous for the side walls of the pressure-tight chambers to be divided at half their extension between the ends and for the parts of the side walls to be are mutually connected there in an articulated manner, particularly by means of a solid-state joint.

According to certain preferred embodiments of the invention, the upper and/or lower cover walls can be formed by outwardly convex domes.

According to other certain preferred embodiments of the invention, the upper and/or lower cover walls can be formed by inwardly convex domes.

According to other certain preferred embodiments of the invention, the upper and/or lower cover walls can be formed by rigid cover plates and can be sealed off by sealing elements acting between the side walls and the rigid cover plates.

According to certain preferred embodiments of the invention, the pressure-tight chambers may have an essentially acute course at their ends which are mutually opposite in the working direction.

According to certain preferred embodiments of the invention, the pressure-tight chambers may have more or less expanded end surfaces at their ends which are mutually opposite in the working direction.

According to certain preferred embodiments of the invention, the elementary cells may be deformable in a working direction while changing their length.

According to certain preferred embodiments of the invention, the elementary cells may be deformable in at least two working directions while changing their length.

The elementary cell arrangement is preferably two-dimensional according to certain preferred embodiments of the invention.

According to certain preferred embodiments of the invention, the elementary cells may be arranged in a matrix-like arrangement parallel side-by-side and above one another in lines and columns.

As an alternative according to certain preferred embodiments of the invention, the elementary cells may be arranged in a honeycomb-type arrangement in an offset manner side-by-side and above one another.

Preferably passage ducts are provided between respective chambers which can be jointly acted upon by the pressure medium, according to certain preferred embodiments of the invention.

The actuator device may be provided for actuating a control surface of an aircraft or spacecraft according to certain preferred embodiments of the invention.

In particular, according to certain preferred embodiments of the invention, the actuator device can be provided as a planar actuator for actuating a rudder surface or trim surface of a shape-variable wing or of a shape-variable fin of an aircraft or spacecraft, particularly of an airplane.

The invention also relates to methods of making and using the respective cellular actuator devices.

Other objects, advantages and novel features of the present invention will become apparent from the following detailed description of the invention when considered in conjunction with the accompanying drawings.

BRIEF DESCRIPTION OF THE INVENTION

FIG. 2 is a top view of a vertical fin of an airplane constructed according to a preferred embodiment of the invention;

FIG. 2b is a slightly enlarged sectional view along Line A-B of FIG. 2a;

Figure 3C:
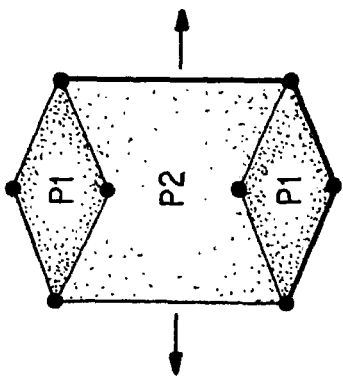
Figure 3B:
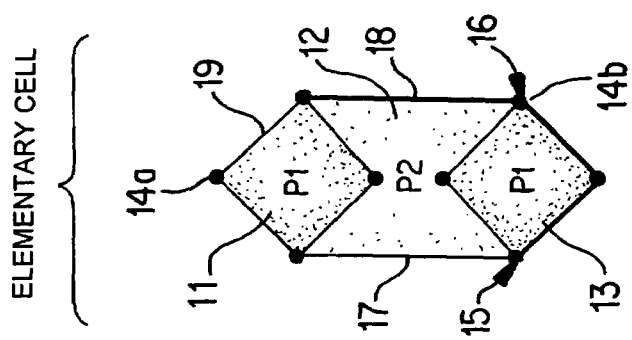
Figure 3A:
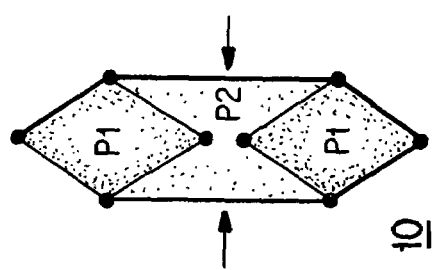
Figure 4A:
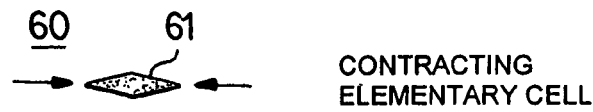
Figure 5C:
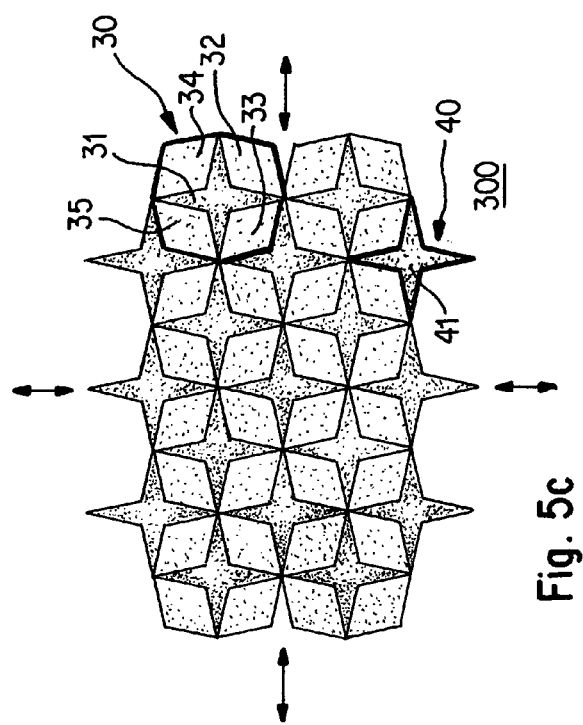
Figure 5B:
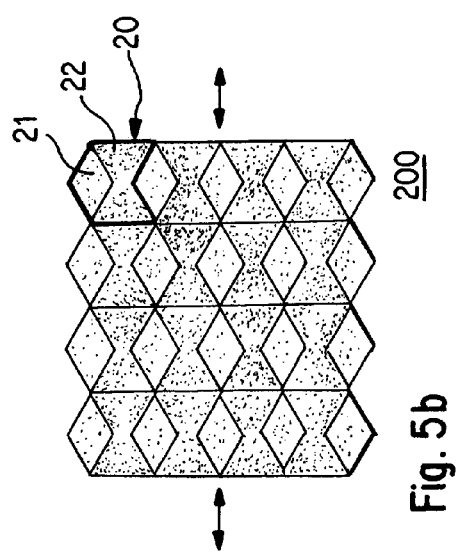
Figure 5A:
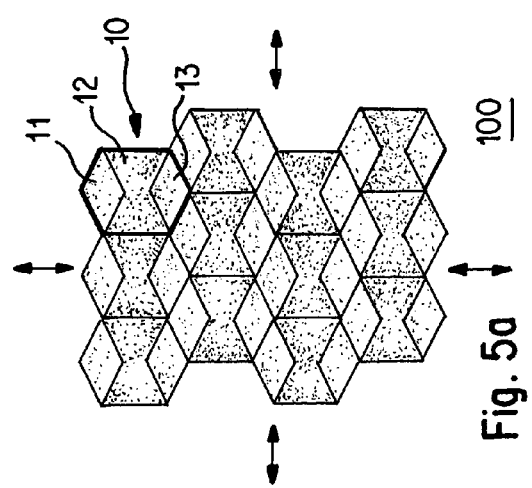
Figure 6:
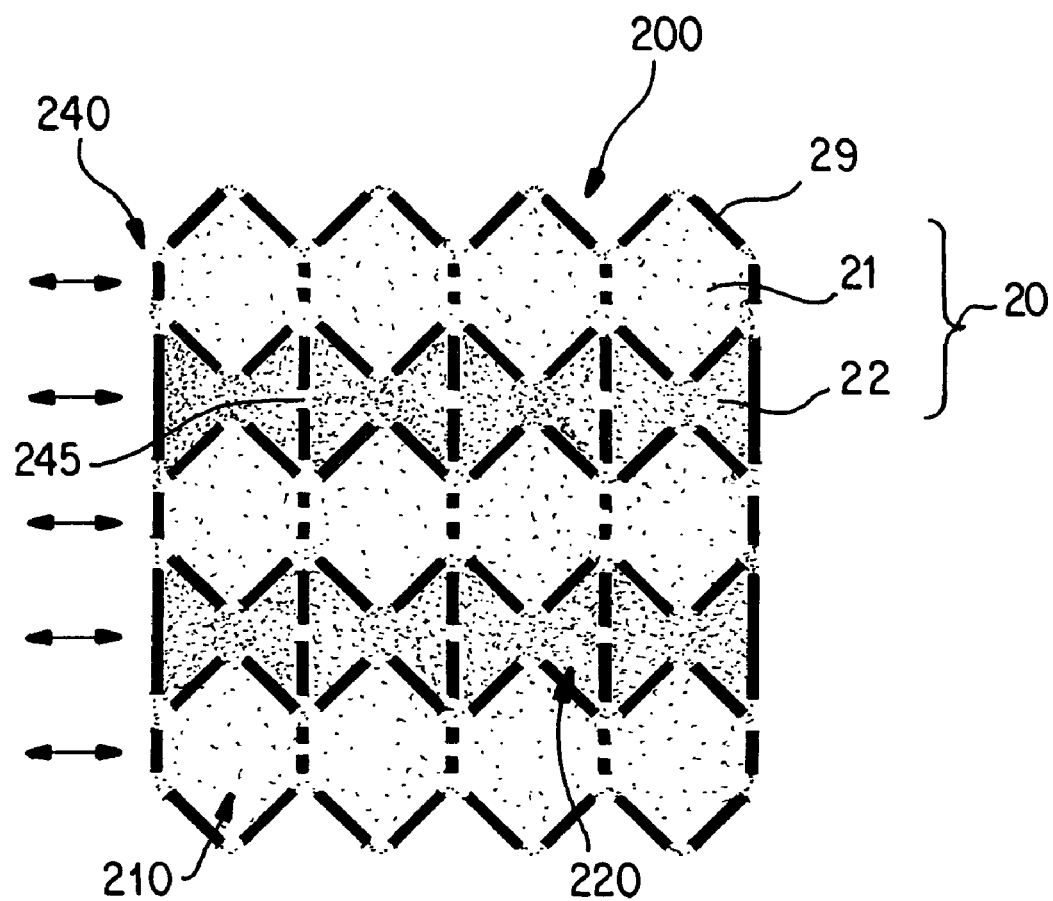
Figure 7A:
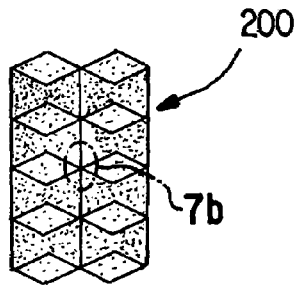
Figure 8A:
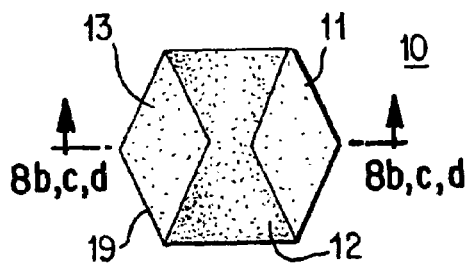

FIGS. 3a) to c) are schematic views of elementary cells of a cellular actuator device according to an embodiment of the invention;

FIGS. 4a) to g) are schematic views of examples of typical elementary cells, as can be used in the case of the cellular actuator device according to respective preferred embodiments of the invention;

FIGS. 5a) to c) are top views of parts of elementary cell arrangements for a cellular actuator device according to three different preferred embodiments of the invention;

FIG. 6 is a schematic representation of an elementary cell arrangement similar to the one illustrated in FIG. 5b), for explaining various aspects of its method of operation;

FIGS. 7a) and b) are views of an elementary cell arrangement as well as of an enlarged cutout therefrom, for explaining further aspects of its method of operation; and FIGS. 8a) to d) are a top view and enlarged lateral views of the sectional view A-B respectively, for explaining three different embodiments for covering elementary cells of a cellular actuator device according to three different embodiments of the invention.

DETAILED DESCRIPTION OF THE DRAWINGS

Figure 1:
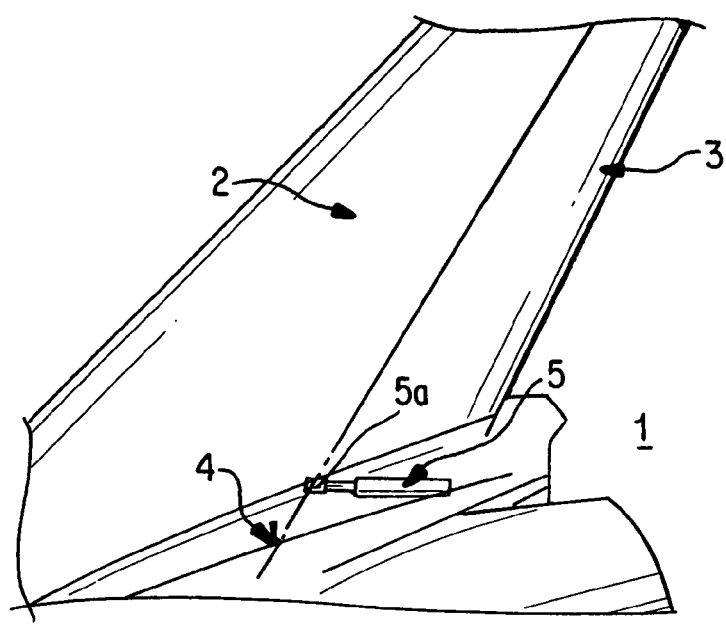
FIG. 1 is a perspective representation of the rear of an only partially shown airplane, for explaining a conventional manner of actuating a control fin of the latter.

The initially addressed FIG. 1 illustrates a rear area of an airplane 1 having a rudder 3, which is a component of its vertical fin 2. The rudder 3 is disposed on the vertical fin 2 to be rotatable by means of a hinge 4, which is outlined only by a partially dash-dotted line. Conventionally, the rudder 3 can be actuated by way of one or several hydraulic cylinders 5 which are linked by way of a lever arm 5a, on the one side, with the rudder 3 and, on the other side, to a part of a stationary structure of the airplane 1.

Figure 2A:
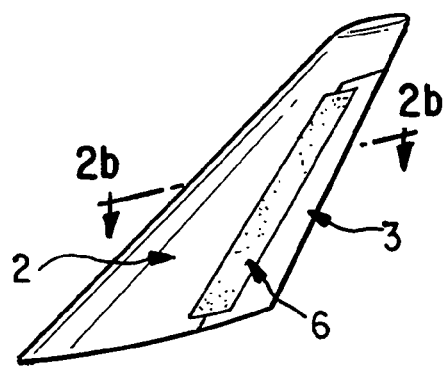
Figure 2B:
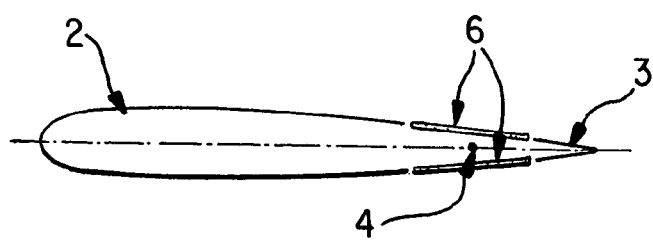

The lateral view of the vertical fin 2 and the rudder 3 illustrated in FIG. 2, in a simplified and schematic manner, shows an embodiment of a cellular actuator device according to the invention. This cellular actuator device, which as a whole has the reference number 6, comprises a planar actuator which is arranged on both sides of an imaginary hinge axis 4, about which the rudder 3 can be rotated with respect to the vertical fin 2. The two components forming the planar actuator of the rudder 3 are components of a cellular actuator device, by which the vertical fin 2, together with the rudder 3, forms a shape-variable wing, or here a shape-variable vertical fin with a smooth transition from the vertical fin 2 stationary with respect to the airplane to the movable rudder 3.

Referring to FIGS. 3, 4 and 5, first some general features of the cellular actuator device according to various embodiments of the invention will now be described. Thus, the cellular actuator device comprises a number of elementary cells 10; 20; 30; 40; 50; 60; 70; 80, which are combined to form a common elementary cell arrangement 100; 200; 300, and are formed by one or more pressure-tight chambers 11, 12, 13; 21, 22; 31, 32, 33, 34, 35; 41; 52; 61; 71, 72, 73; 81.

The elementary cells 10; 20; 30; 40; 50; 60; 70; 80 can be acted upon by a pressure medium to be deformed in at least one working direction while changing their length. The pressure medium may be a liquid hydraulic fluid or it may be gaseous, for example, air.

For combining their length changes in the at least one working direction to an overall movement of the elementary cell arrangement 100; 200; 300, the elementary cells 10; 20; 30; 40; 50; 60; 70; 80 are mutually coupled. In the case of the rudder illustrated in FIG. 2, the formed cellular actuator device would be deformable in a working direction while changing its length, specifically in a direction transversely to the hinge axis 4, thus essentially in the direction of the intersection line A-B illustrated in FIG. 2a). For a deflection of the rudder 3, for example, upward in FIG. 2b), the upper cellular actuator device 6 would be contracted and the lower cellular actuator device, in contrast, would be expanded, or vice-versa.

By means of an embodiment which is illustrated in FIGS. 3a) to c), the basic method of operation of a bidirectional elementary cell 10 will now be explained. The elementary cell 10 is of a type containing at least one first pressure-tight chamber and at least one second pressure-tight chamber, so that a bidirectional method of operation can be implemented.

In the case of the embodiment illustrated in FIGS. 3a) to c), the elementary cell 10 contains two first pressure-tight chambers 11, 13 and one second pressure-tight chamber 12. These chambers 11, 12, 13 are formed and delimited by walls 19 which extend vertically to the plane of the drawing and of which only one is indicated for reasons of clarity, as well as by upper and lower covers, which are not shown in the figure. The individual walls are mutually connected by bendable joints, for example, in the form of strips of a reduced wall thickness, of which two joints 14a, 14b are identified in FIG. 3.

The second chamber 12 is acted upon in its interior by a pressure P2, while the first chambers 11, 13 are both acted upon by the same pressure P1. When the same pressure P1=P2 exists in the three chambers 11, 12, 13, the elementary cell 10 is in its neutral position, which is illustrated in FIG. 3b). When the pressure P1 in the two first chambers 11, 13 is increased in comparison to the pressure P2 in the second chamber 12, the volume rises in the two first chambers 11, 13 in comparison to the volume in the second chamber 12, which results in a contraction of the elementary cell 10 in the working direction indicated by the two arrows; compare FIG. 3a). If, on the other hand, the pressure P2 in the second chamber 12 is increased with respect to the pressure P1 in the first chambers 11, 13, this results in an expansion of the volume in the second chamber 12 with respect to the volumes in the first chambers 11, 13, and the elementary cell 10 expands in the illustrated working direction, compare FIG. 3c). FIG. 3 is only a schematic view; the cross-sectional shape of the first chambers 11, 13, in the neutral position—FIG. 3b)—may be more similar to that illustrated in FIG. 3c), so that, when the pressure P1 is increased, not only a relative volume enlargement with respect to the volume of the second chamber 12 takes place, but also an absolute enlargement of the volume of the first chambers 11, 13.

The length change of the elementary cell 10 is coupled in the cellular actuator device to an overall movement, which can then be utilized as a control movement.

FIG. 4 shows some examples of possible typical shapes of elementary cells representative of a whole number of different shapes of the latter.

FIG. 4a) shows a contracting elementary cell 60 with a single chamber 61.

Figure 4B:

FIG. 4b) shows an expanding elementary cell 50 with a single chamber 52.

Figure 4C:
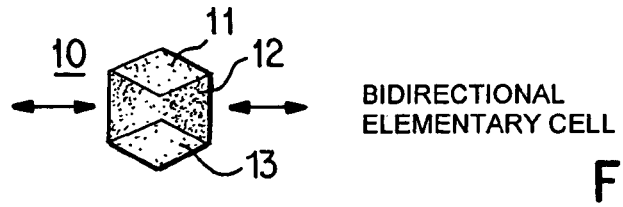

FIG. 4c) illustrates a bidirectional elementary cell 10 with two first chambers 11, 13 and one second chamber 12, as explained above with reference to FIG. 3.

Figure 4D:
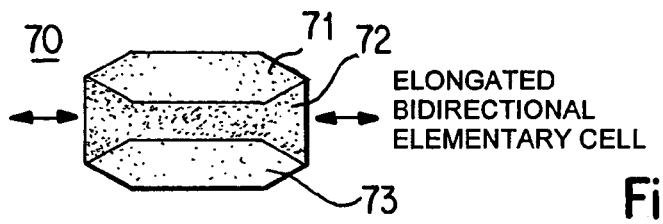

FIG. 4d) illustrates an elongated bidirectional elementary cell 70 with two first chambers 71, 73 and one second chamber 72, which, with respect to its method of operation, is similar to the bidirectional elementary cell 10 illustrated in FIG. 4c).

Figure 4E:
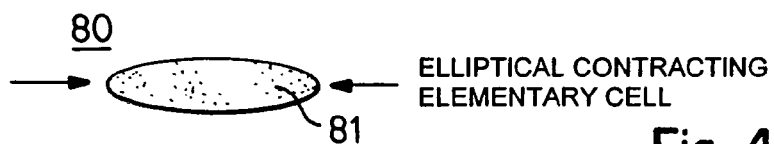

FIG. 4e) shows an elliptical contracting elementary cell 80 with a single chamber 81.

Figure 4F:
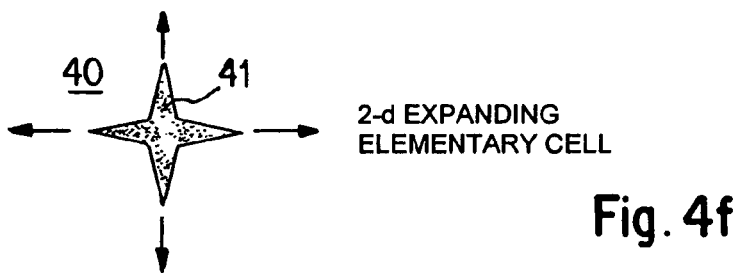

FIG. 4f) illustrates an elementary cell 40 which is formed by a single chamber 41 and which is capable of expanding in two mutually perpendicular directions in a two-dimensional manner, as illustrated by the arrows.

Figure 4G:
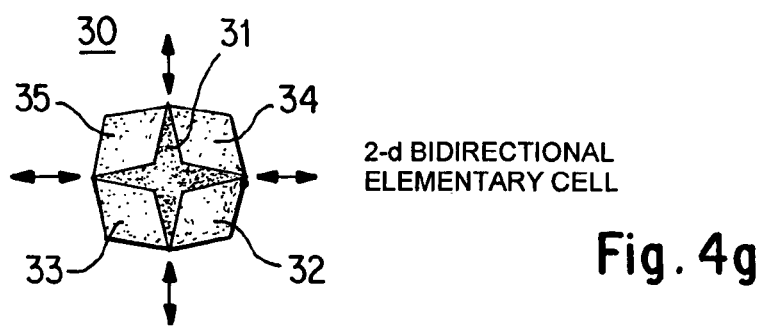

FIG. 4g) finally also shows a two-dimensionally functional elementary cell 30, which is formed by a first chamber 31 and four second chambers 32, 33, 34, 35.

The working direction, the possible travel and the possible forces of the illustrated elementary cells 10 . . . 80 are defined by the configuration of the cells. According to the configuration, cellular forces are obtained which can build up only tensile force, that is, contraction; only pressure, that is expansion; or a combination of tensile force and pressure. Thus, cellular actuator devices are conceivable which act in only one direction in space and, in the directions in space which are normal thereto, have no lateral extension; on the other hand, configurations are conceivable which exhibit a defined coupling between the extensions in various directions in space.

A significant characteristic of the cellular actuator device is the combination of individual elementary cells to form an elementary cell arrangement, in which the length changes are additively combined in one or more working directions.

The elementary cells 40; 50; 60; 80 illustrated in FIGS. 4a), b), e) and f) are formed by a single pressure-tight chamber 41; 52; 61; 81. When acted upon by the pressure medium, they can be deformed in a contracting manner; compare FIGS. 4a) and e), or can be deformed in an expanding manner; compare FIGS. 4b) and f), while changing their length in the working direction.

The elementary cells 10; 30; 50; 70 illustrated in FIGS. 4c, d) and g) each contain at least one first pressure-tight chamber 11, 13; 21; 31; 71, 73, and at least one second pressure-tight chamber 12; 22; 32, 33, 34, 35; 72. When the former is acted upon, they can be deformed in a contracting manner in the working direction while changing their length; when the latter is acted upon, they can be deformed in an expanding manner in the working direction while changing their length. When the (first) pressure-tight chambers 11, 13; 21; 61; 71, 73; 81 have an essentially convex cross-sectional shape in a direction extending parallel to the working direction, an action by the pressure medium, while reinforcing its convexity, causes an enlargement of the extension transversely to the working direction and a contraction in the working direction; that is, the chambers become more bulged and shorter. When the (second) pressure-tight chambers 12; 52; 72 in the direction parallel to the working direction have an essentially concave cross-sectional shape, an action by the pressure medium while weakening the concavity, causes an enlargement of the extension transversely to the working direction and an expansion in the working direction; that is, the chambers become less hollow and longer.

FIGS. 5a to c) show three different embodiments of elementary cell arrangements 100; 200; 300 in a two-dimensional shape.

In the case of the embodiment 200 illustrated in FIG. 5b), the elementary cells 20 are provided parallel side-by-side and above one another in lines and columns in a matrix-like arrangement. The elementary cells 20 correspond essentially to the bidirectional elementary cells 10 illustrated in FIGS. 3a) to c) and in FIG. 4c); however, each elementary cell 20 effectively having only one first chamber 21 and one second chamber 22; or, in other words, two adjacent elementary cells 20 each share a first chamber 21. Otherwise, the function is the same as in the case of the elementary cells 10 illustrated in FIGS. 3a to c) and FIG. 4c).

In the embodiments illustrated in FIGS. 5a) and c), the elementary cells 10; 30; 40 are arranged in a honeycomb-like side-by-side and offset above one another arrangement 100 or 300.

While the elementary cell arrangement 200 illustrated in FIG. 5b) is bidirectionally deformable only in one working direction shown by the arrows, the elementary cell arrangements 100 and 300 illustrated in FIGS. 5a) and c) can be deformed in two mutually perpendicular working directions, as indicated by the arrows.

The combination of the individual elementary cells to a common elementary cell arrangement of the cellular actuator device is an important aspect of preferred embodiments of the invention.

As illustrated in FIG. 6, which represents an elementary cell 200 similar to that shown in FIG. 5b), the first chambers 21 of the elementary cells 20 are combined to a first chamber system 210, and the second chambers 22 of the elementary cells 20 are combined to a second chamber system 220. Between the first chambers 21 of the first chamber system 210, which can be jointly acted upon by the pressure medium, passage ducts 240 are provided, and between the second chambers 22 of the second chamber system 20, which can be jointly acted upon by the pressure medium, passage ducts 245 are provided.

Figure 7B:
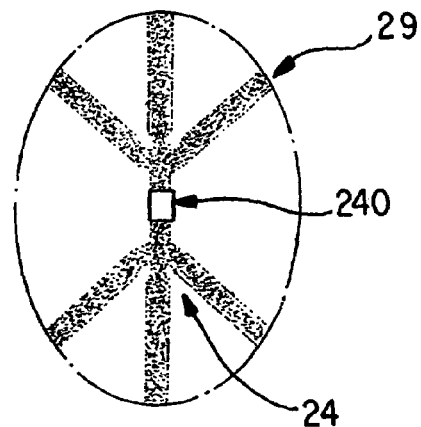

In FIG. 7, which again illustrates an elementary cell arrangement 200 similar to that shown in FIG. 5b), the passage ducts 240 are provided in a connection surface between two adjacent chambers of various elementary cells, and the walls 29 of the elementary cells are mutually connected by way of joints or articulated connection points 24.

As an example, by means of an elementary cell 10 similar to that shown in FIGS. 3a) to c) and 4c), FIG. 8 shows its lateral construction. Thus, the pressure-tight chambers of the elementary cells are delimited by ends, which are mutually opposite in the working direction, and by side walls extending between the ends, and upper and lower cover walls sealing off the chambers on their top side and their bottom side.

Figure 8B:
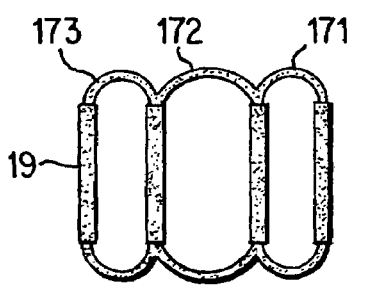

These upper and/or lower cover walls may be formed by outwardly convex domes 171, 172, 173, as indicated in FIG. 8b).

Figure 8C:
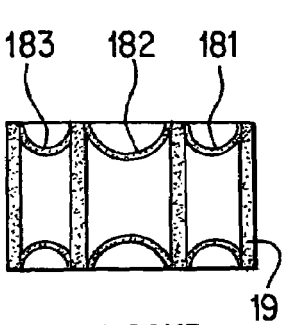
Figure 8D:
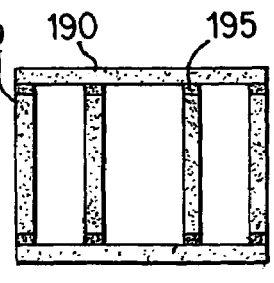

As an alternative, they may be formed by inwardly convex domes 181, 182, 183, as illustrated in FIG. 8c).

According to another embodiment, the upper and/or lower cover walls may be formed by rigid cover plates 190, which are sealed off by means of sealing elements 195 effective between the lateral walls 19 and the rigid cover plates 190.

Again generally referring to FIGS. 3, 4 and 5, the pressure-tight chambers 11, 13; 21; 31; 41; 61; 71, 73 may be constructed such that they have an essentially acute course at their ends which are situated in a mutually opposite manner in the working direction; that is, without particularly extended end surfaces, or they may have more or less extended end surfaces 17 at their ends situated opposite in the working direction, such as the chambers 12; 22; 32, 33, 34, 35; 52; 72; compare particularly FIGS. 4b), c), d) and g), as well as particularly shown for the chambers 12 with the end surfaces 17, 18; compare particularly FIG. 3b).

The individual elementary cells may be combined such that they result in different shapes of the cellular actuator device. In the simpler case, the elementary cells are arranged in a plane, so that a plate-shaped cellular actuator is obtained. By means of other spatial arrangements of the elementary cells, planar or spherically or generally three-dimensionally curved actuators are also contemplated. Also spatially closed configurations, such a tube-type actuator structures are also contemplated.

Depending on the field of application, the implementation of the elementary cells may take place by means of different materials. For high pressures and temperatures, elementary cells made of metal would be meaningful, while for lower pressures, plastic materials or fiber-reinforced plastic materials can also be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Cellular actuator device having a plurality of pressure-tight chambers, which are combined to a common arrangement which can be acted upon by a pressure medium and, when acted upon by the pressure medium, can be deformed in at least one work direction while changing their length, and thus being able to move two parts of a structure with respect to each other whereby the structure parts are connected to the chambers, characterized by elementary cells each comprising at least one of said plurality of pressure-tight chambers, which chambers are formed by walls mutually connected by way of joints or articulated connection points and which chambers are coupled to a matrix-like arrangement of elementary cells in a way, that, when pressurization acts upon the elementary cells, the length changes in the at least one work direction of the individual elementary cells are additively combined to an overall movement of the elementary cell arrangement.

2. Cellular actuator device according to claim 1, wherein the elementary cells each contain a single pressure-tight chamber.

3. Cellular actuator device according to claim 1, wherein the elementary cells are deformable in a contracting manner in the working direction while changing their length when the pressure-tight chambers are acted upon by the pressure medium.

4. Cellular actuator device according to claim 1, wherein the elementary cells can be deformed in an expanding manner in the working direction while changing their length when the pressure-tight chambers are acted upon by the pressure medium.

5. Cellular actuator device according to claim 1, wherein the elementary cells each contain at least one first pressure-tight chamber and at least one second pressure-tight chamber.

6. Cellular actuator device according to claim 5, wherein the elementary cells are deformable in a contracting manner in the working direction while changing their length when the first pressure-tight chambers are acted upon.

7. Cellular actuator device according to claim 5, wherein the elementary cells are deformable in an expanding manner in the working direction while changing their length when the second pressure-tight chambers are acted upon.

8. Cellular actuator device according to claim 3, wherein the pressure-tight chambers have an essentially convex cross-sectional shape in a direction parallel to the working direction such that an action by means of the pressure medium, while reinforcing the convexity of the pressure-tight chambers, causes an enlargement of the extension transversely to the working direction and a contraction in the working direction.

9. Cellular actuator device according to claim 6, wherein the first pressure-tight chambers have an essentially convex cross-sectional shape in a direction parallel to the working direction such that an action by means of the pressure medium, while reinforcing the convexity of the pressure-tight chambers, causes an enlargement of the extension transversely to the working direction and a contraction in the working direction.

10. Cellular actuator device according to claim 4, wherein the pressure-tight chambers have an essentially concave cross-sectional shape in a direction parallel to the working direction such that an action by means of the pressure medium, while decreasing the concavity of the pressure-tight chambers, causes an enlargement of the extension transversely to the working direction and an expansion in the working direction.

11. Cellular actuator device according to claim 7, wherein the second pressure-tight chambers have an essentially concave cross-sectional shape in a direction parallel to the working direction such that an action by means of the pressure medium, while decreasing the concavity of the pressure-tight chambers, causes an enlargement of the extension transversely to the working direction and an expansion in the working direction.

12. Cellular actuator device according to claim 1, wherein the pressure-tight chambers are delimited by ends which are mutually opposite in the working direction, by side walls extending between the ends, and by upper and lower cover walls sealing off the chambers on their top side and their bottom side.

13. Cellular actuator device according to claim 12, wherein the side walls are divided at half their extension between the ends and the parts of the side walls are mutually connected there in an articulated manner by means of a solid-state joint.

14. Cellular actuator device according to claim 12, wherein the upper andlor lower cover walls are formed by outwardly convex domes.

15. Cellular actuator device according to claim 13, wherein the upper and/or lower cover walls are formed by outwardly convex domes.

16. Cellular actuator device according to claim 12, wherein the upper and/or lower cover walls are formed by inwardly convex domes.

17. Cellular actuator device according to claim 14, wherein the upper and/or lower cover walls are formed by inwardly convex domes.

18. Cellular actuator device according to claim 12, wherein the upper and/or lower cover walls are formed by rigid cover plates and are sealed off by sealing elements acting between the side walls and the rigid cover plates.

19. Cellular actuator device according to claim 14, wherein the upper and/or lower cover walls are formed by rigid cover plates and are sealed off by sealing elements acting between the side walls and the rigid cover plates.

20. Cellular actuator device according to claim 12, wherein the pressure-tight chambers have an essentially acute course at their ends which are mutually opposite in the working direction.

21. Cellular actuator device according to claim 14, wherein the pressure-tight chambers have an essentially acute course at their ends which are mutually opposite in the working direction.

22. Cellular actuator device according to claim 18, wherein the pressure-tight chambers have an essentially acute course at their ends which are mutually opposite in the working direction.

23. Cellular actuator device according to claim 12, wherein the pressure-tight chambers have end surfaces at their ends which are mutually opposite in the working direction.

24. Cellular actuator device according to claim 14, wherein the pressure-tight chambers have end surfaces at their ends which are mutually opposite in the working direction.

25. Cellular actuator device according to claim 1, wherein the elementary cells are deformable in a working direction while changing their length.

26. Cellular actuator device according to claim 1, wherein the elementary cells are deformable in at least two working directions while changing their length.

27. Cellular actuator device according to claim 1, wherein elementary cell arrangement formed by the number of elementary cells is two-dimensional.

28. Cellular actuator device according to claim 18, wherein the elementary cells are arranged in a matrix-like arrangement parallel side-by-side and above one another in lines and columns.

29. Cellular actuator device according to claim 18, wherein the elementary cells are arranged in a honeycomb-type arrangement in an offset manner side-by-side and above one another.

30. Cellular actuator device according to claim 27, wherein passage ducts are provided between chambers which can be jointly acted upon by the pressure medium.

31. Cellular actuator device according to claim 28, wherein passage ducts are provided between chambers which can be jointly acted upon by the pressure medium.

32. Cellular actuator device according to claim 29, wherein passage ducts are provided between chambers which can be jointly acted upon by the pressure medium.

33. Cellular actuator device according to claim 1, wherein the actuator device is configured for actuating a control surface of an aircraft or spacecraft.

34. Cellular actuator device according to claim 33, wherein the actuator device is provided as a planar actuator for actuating a rudder surface or trim surface of a shape-variable wing or of a shape-variable fin of an aircraft or spacecraft, particularly of an airplane.

35. A cellular actuator device for a vehicle control surface, comprising:
   a plurality of variable size pressure tight chambers combined to form a common arrangement, said chambers coupled to a matrix-like arrangement of elementary cells which are coupled together to facilitate dimensional changes in the common arrangement in dependence on changes in pressure in said chambers wherein said dimensional changes include a change in length in at least one work direction of individual ones of said cells wherein said change in length are additively combined, and a fluid pressure controller for controlling pressure in said chambers.

36. A method of using the actuator device of claim 35, comprising controllably operating said controller to vary the pressure in said chambers and thereby changing the surface configuration of a vehicle control surface.

37. A method of making a cellular actuator device for a vehicle control surface, comprising:

forming a plurality of pressure tight chambers having flexible chamber walls, coupling said chambers to a matrix-like arrangement of elementary cells including at least one chamber connecting said pressure tight chambers to form a common arrangement of elementary cells with pressure connection between a plurality of said pressure tight chambers such that, in use, pressure control changes a length in at least one work direction each of said cells and additively combining said changes in length to provide overall movement of said arrangement, and connecting a cover to said common arrangement, which cover in use forms at least a portion of vehicle control surface.

38. A method according to claim 37, wherein said pressure tight chambers are made of metal.

39. A method according to claim 38, wherein said pressure tight chambers are made of plastic.

40. A method according to claim 38, wherein said pressure tight chambers are made of fiber reinforced plastic materials.

* * * * *